United States Patent [19]

Majeau et al.

[11] 3,893,031

[45] July 1, 1975

[54] SYNCHRONIZATION SYSTEM FOR VOICE PRIVACY UNIT

[75] Inventors: Henrie L. Majeau; Neil W. Heckt, both of Bellevue; Jack L. May, Redmond, all of Wash.

[73] Assignee: The Boeing Company, Seattle, Wash.

[22] Filed: Nov. 8, 1972

[21] Appl. No.: 304,843

[52] U.S. Cl. ........... 325/32; 178/69.5 R; 179/1.5 R; 235/181

[51] Int. Cl. ............................ H04k 1/00; H04l 7/00

[58] Field of Search ............ 325/32; 178/22, 69.5 R; 179/1.5 R, 1.5 M; 235/181

[56] References Cited

UNITED STATES PATENTS

| | | | |
|---|---|---|---|
| 3,463,911 | 8/1969 | Dupraz et al. | 235/181 |
| 3,586,776 | 6/1971 | Salava | 178/69.5 R |
| 3,624,297 | 11/1971 | Chapman | 179/1.5 R |
| 3,629,505 | 12/1971 | Zegers et al. | 178/69.5 R |
| 3,670,151 | 6/1972 | Lindsay et al. | 235/181 |
| 3,694,757 | 9/1972 | Hanna, Jr. | 178/22 |
| 3,696,207 | 10/1972 | Lundin et al. | 325/32 |
| 3,710,027 | 1/1973 | Herter et al. | 178/69.5 R |
| 3,723,878 | 3/1973 | Miller | 325/32 |
| 3,760,355 | 9/1973 | Bruckert | 235/181 |
| 3,766,316 | 10/1973 | Hoffman et al. | 178/69.5 R |

OTHER PUBLICATIONS

*Error Correcting Codes*, Peterson et al., 1972, (First Ed. 1961), *MIT Press*, pp. 374, 376.

*Primary Examiner*—Maynard R. Wilbur
*Assistant Examiner*—H. A. Birmiel
*Attorney, Agent, or Firm*—Christensen, O'Connor, Garrison, & Havelka

[57] ABSTRACT

A system for synchronizing the operation of two or more voice privacy units. At least one otherwise "clear" tone is modulated by a statistically random signal known as a Barker word, this tone then being mixed with the audio signals and transmitted. The modulation is present for a very short time, the conclusion of the modulation initiating the operation of a code generator which scrambles the succeeding audio signals. The recognition of the reception of the modulated tone at the receiver initiates the operation of its code generator (at the conclusion of the modulation), thereby recovering the original plaintext speech.

11 Claims, 6 Drawing Figures

SYNCHRONIZATION SYSTEM FOR VOICE PRIVACY UNIT

BACKGROUND OF THE INVENTION

This invention relates broadly to the art of secure communication, and more particularly to the art of synchronizing the operation of coding and decoding apparatus between individual voice privacy units. With the increasing sophistication of electronic technology, it is now possible for a good number of people to have easy access to present voice radio communications. This access to private communications are often unauthorized and thus undesirable from a privacy or security standpoint.

As an example, it is readily apparent that many persons have access to the communications of police and fire departments, and other governmental operations, since radios may be easily purchased having police band coverage.

Therefore, it is often desirable to have the capability of communicating in a secure or private mode, whereby the communication can only be understood by the transmitter and the receiver of the communication. There have been many attempts in the past to establish a reliable and secure means of communication. However, the "scrambling" of transmitted speech through the use of a code or cipher has frequently been unsuccessful because of difficulties in achieving rapid, accurate, and dependable synchronization between two or more communicating units. Additionally, prior art systems have been plagued with a poor intelligibility level at the receiving end of the transmission, as well as a rather high rate of compromise. Thus, the use of a cipher to scramble plain-text speech, a system which has high security, has the disadvantage of requiring a dependable and accurate means of synchronization for proper operation.

In accordance with the above, it is an object of this invention to provide a voice privacy unit which may be accurately synchronized with another such unit.

It is another object of this invention to provide a synchronization system which will result in a high intelligibility level of recovered speech.

It is a further object of this invention to provide a synchronization system wherein the synchronization signal is mixed with the speech to be transmitted.

Other and further objects, features, and advantages of the invention will become apparent as the description proceeds.

Briefly, in accordance with a preferred embodiment of the present invention, the present invention includes generating an audio tone, which is eventually mixed with the speech to be transmitted when the speech is to be enciphered. Under the control of a timing apparatus, the tone is modulated for a short period by a statistically random digital signal. During this period, shortly after the start of transmission, the transmitted speech is not enciphered. The conclusion of the modulation initiates the operation of the code generator for the enciphering of the speech, the now unmodulated tone, still being mixed with the transmitted speech, indicating an enciphered transmission.

Upon receipt of the enciphered material, the receiving unit first recognizes the presence of the audio tone, which indicates to the receiver that the transmission is enciphered. The presence of the modulation is then detected and correlated, and following this, the operation of the code generator in the receiving unit is initiated, resulting in the proper deciphering of the transmitted message.

A more thorough understanding of the invention may be obtained by a study of the following description of the preferred embodiment in connection with the accompanying drawings in which.

DESCRIPTION OF THE PREFERRED EMBODIMENT

Figure 1:
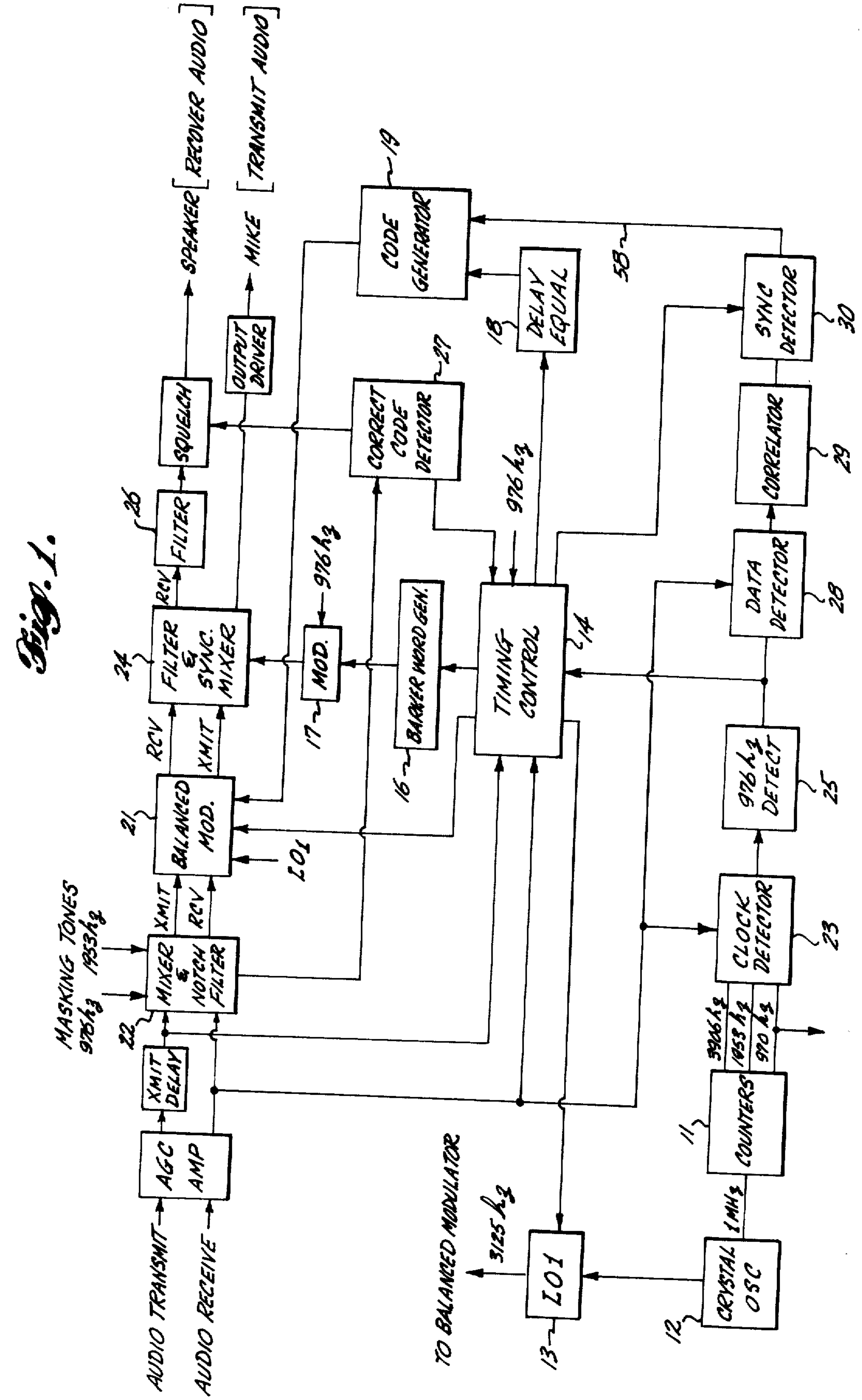
FIG. 1 is a simplified block diagram of a voice privacy system, utilizing the synchronization system of the present invention.

Referring now to FIG. 1, a block diagram of a speech privacy unit is shown, including the synchronization circuits. When a unit is in the transmit state and is operating in the secure mode, the counters 11 divide the frequency generated by the crystal oscillator 12 and the timing sequences of the entire unit are initiated. During the first 50 milliseconds to 1.0 second, the unit produces no speech output to the transmitter. This variable amount of time is manually adjustable, and allows time for special operations, such as establishing a repeater link to the receiver, to be performed.

Figure 3B:
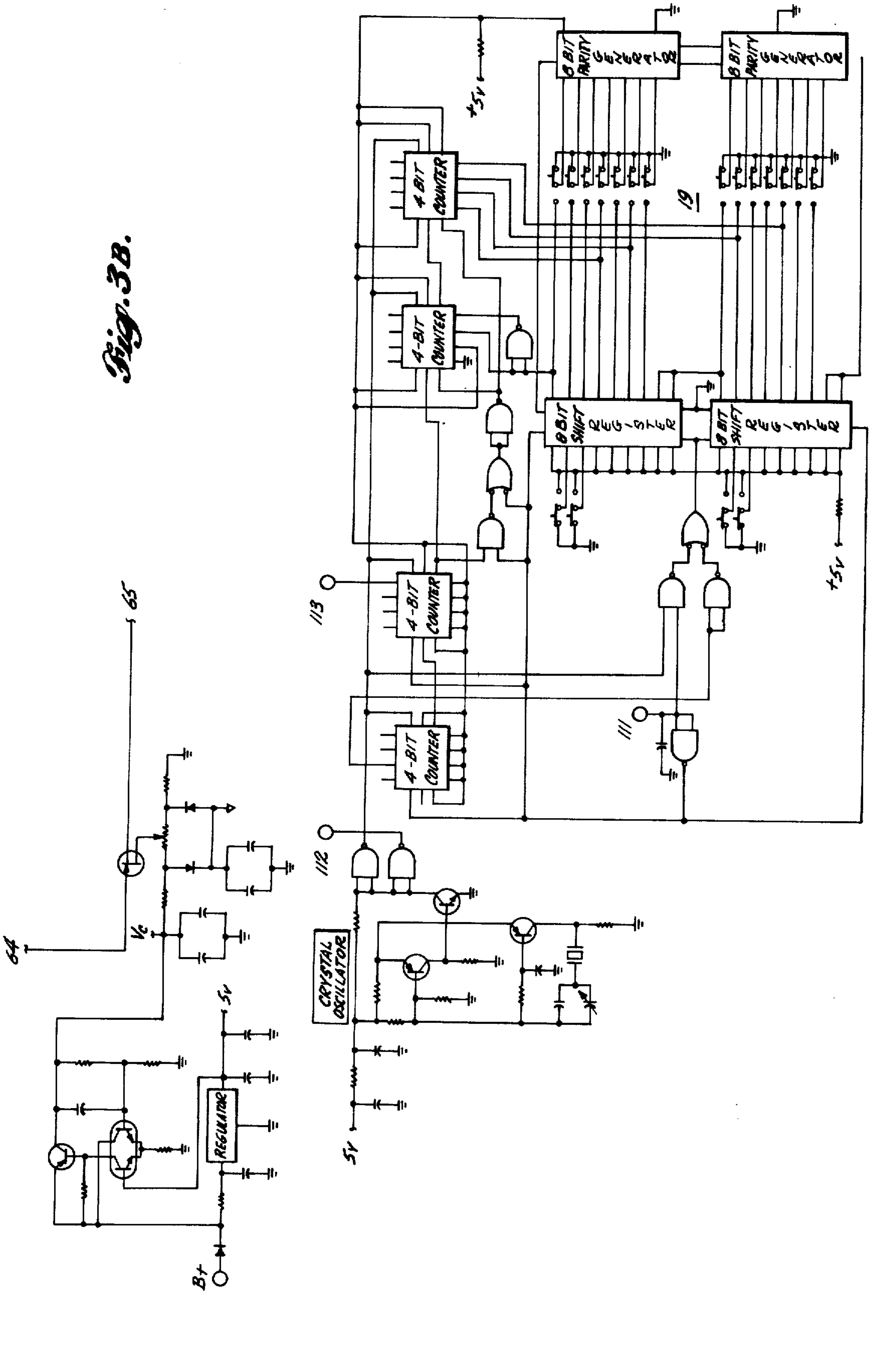
FIGS. 3A and 3B are schematic diagrams of the circuits in the audio processing portion of a voice privacy unit utilizing the synchronization system of the present invention.

Following this delay period, a 3,125Hz signal from a first local oscillator 13 is used to invert the speech signal. This inverted speech signal is then mixed with a clear 976Hz tone and then transmitted. Although the unit is in the secure mode, the transmission of speech during this period is not scrambled, as the code generator of the transmitter is at this point not enabled. This period of transmission, comprising 832 milliseconds, allows time for a communication link to be established between the communicating units. Following this period, which is determined by the timing and control circuit 14, a Barker word signal generator 16 is enabled. The Barker word signal will be more fully explained in the following paragraphs. In essence, it is a statistically random digital word, 13 bits in length. The Barker word modulates the above-mentioned 976Hz tone in the sync modulator 17, and the modulated tone is transmitted as the sync signal to the receiver. Following the modulation of the 976Hz tone by two Barker words (26 bits) the counters in the timing circuitry 14 are inhibited. At the same time, a sync signal is sent from the delay equalizer 18 to the code generator 19. This initiates the operation of the transmitter code generator. The pseudo-random code generator is shown in FIG. 3B and its operation is more fully explained in copending application Ser. No. 178,000, entitled "Voice Privacy Unit For Intercommunication Systems," and application Ser. No. 179,416, entitled "Pseudo Random Frequency Generator," both applications being assigned to the same assignee as the present invention.

The output frequency of the pseudo-random code generator 19 is then applied to the balanced modulator 21 with the speech signals and the audio modulates the code generator output. Simultaneously with the conclusion of the Barker word transmission, masking tone circuits of 976Hz and 1,953Hz are enabled, and the tones are mixed together with the audio before modulation, utilizing an operational amplifier in the notch filter circuit 22. The composite signal for transmission comprises the original audio, mixed with the two masking tones, which modulates the pseudo-random frequency signal of the code generator 19, producing sum and difference frequencies. After modulation, the signal is mixed with a clear 976Hz signal by the filter 26 plus mixer 24. This clear 976Hz tone is initiated at the very start of a secure transmission as explained above, then is modulated by the Barker word for 26 bits (26.6ms) and then reverts to a clear tone for the remainder of the transmission. This signal indicates that the communication is in the secure mode.

At the receiver, the "clear" 976Hz tone is initially extracted by the clock detector circuit 23 and then detected by a phase locked loop 25. If the clear 976Hz tone is absent, the received signal is not in the secure mode; if the tone is detected, the signal is scrambled and must be deciphered. A specific timing sequence is initiated if the tone is detected, meaning that deciphering is necessary for audio recovery. The receiver will first "listen" to the received transmission, utilizing the unit's pseudo-random code generator. A second phase-locked loop in the correct code detector circuit 27 attempts to detect the presence of a 976Hz masking tone during the first 104 ms of received transmission. If this masking tone is determined to be present during this period, it indicates that the transmission is already in progress and is not "new." If this is the case, the unit continues to use the pseudo-random code generator for deciphering, as the message is at that point scrambled.

If, however, it is a new transmission, the local oscillator 13 using a fixed frequency of 3,125Hz will be utilized for demodulating the received signal during the next 728 milliseconds of transmission (after the first 104 ms). This period matches, in time, with the transmission by the transmitting unit wherein the local oscillator 13 was used to invert the audio signals and the clear 976Hz tone. At the end of this period, the transmission will have included the two Barker words, which modulated the 976Hz clear tone. The presence of the Barker words is detected by a data detector 28, which in the preferred embodiment is a full wave synchronous detector. This data is then applied to a correlator 29 and sync detector 30 to determine whether the transmission is a genuine Barker word. If it is, a synchronizing signal is sent to the code generator 19 of the receiving unit, and the pseudo-random frequency generator of the receiver begins operation. Relative to the transmitted information, the code generators in both the transmitting and receiving units are initiated at identical times. The receiver thus is capable of decoding the received signal, if the pseudo-random frequency outputs of the code generators in both the transmitter and the receiver are identical. To set up a particular cipher (sequence of pseudo-random frequency outputs) in a pseudo-random frequency generator, a series of switches must be manipulated. Previous mentioned application Ser. No. 179,416 provides a detailed explanation of the operation of such a generator. The manipulation of these switches provides a particular cipher for the encrypting and decrypting of speech signals; and if both units have the same pattern of switch settings, secure communication is possible with the selected cipher.

Figure 2A:
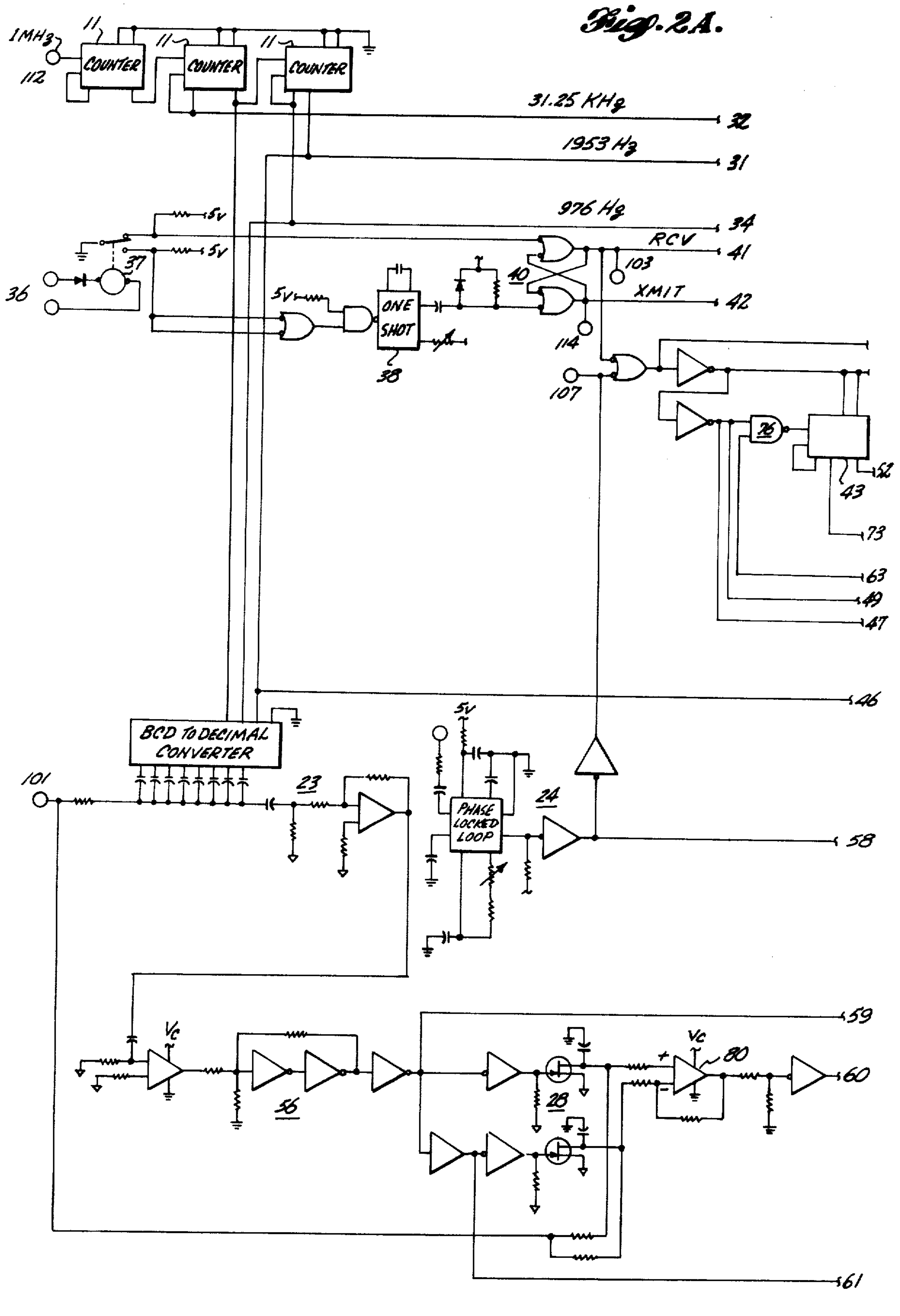
FIGS. 2A and 2B are schematic diagrams of the synchronizing circuitry of the present invention.
Figure 2B:
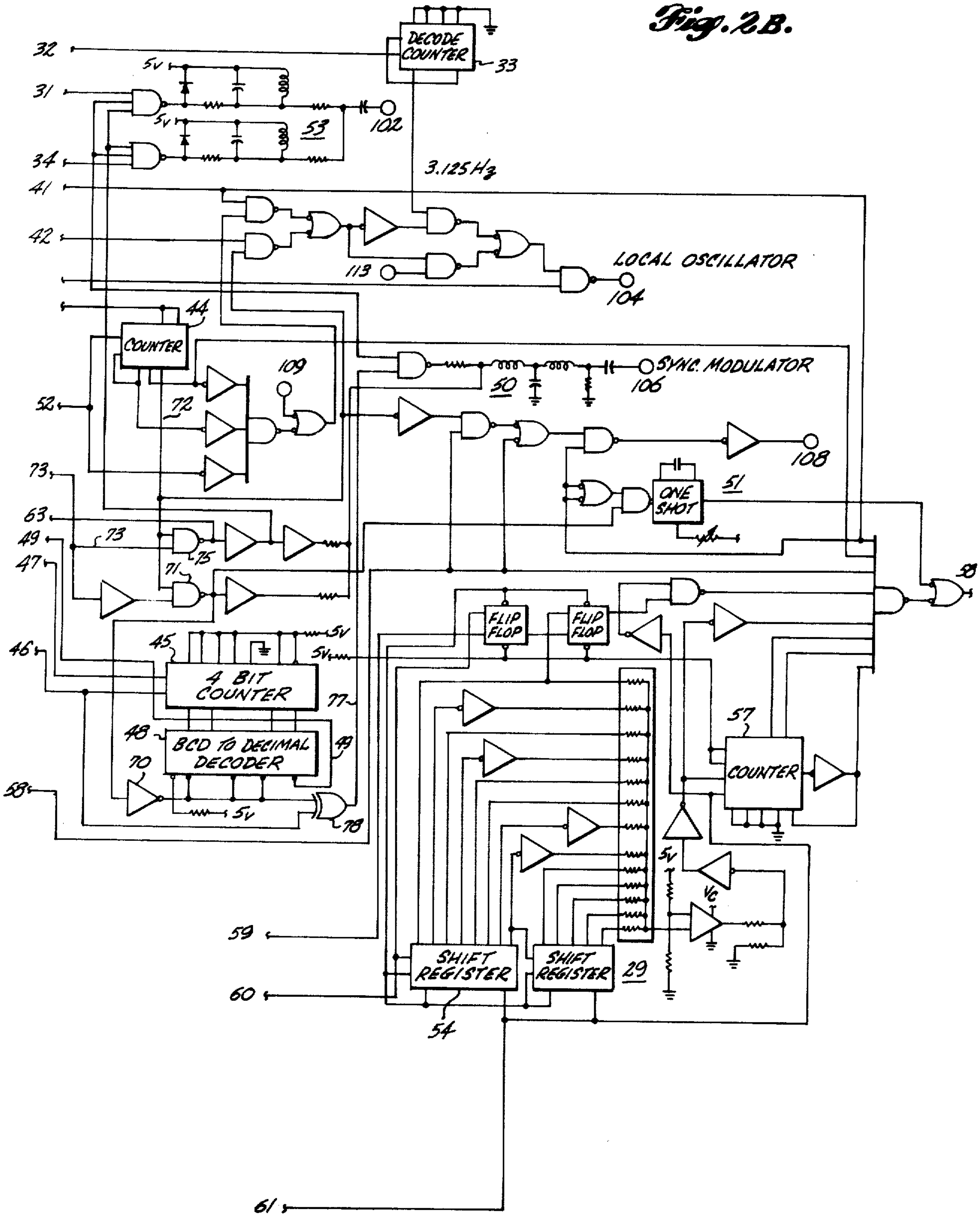

Detailed block diagrams of the invention are shown in FIGS. 2 and 3, with the numerals above 100 designating interconnections between the figures. In regard to the synchronization circuitry, the schematic of which is shown in FIGS. 2A and 2B, the crystal clock frequency of 1 MHz is applied to a series of counters 11—11 which produce the various tones required for the operation of the system. A 31.25 KHz tone on line 32 is applied to counter 33 which divides that frequency by 10 to produce a 3.125 KHz signal which is the frequency of the local oscillator of each unit. In addition, the counters 11—11 also produce three other frequency tones: 3,906Hz, 1,953Hz (line 31), and 976Hz (line 34). A 976Hz signal and a 1,953Hz signal are used for the masking tones (circuit 53), and a 976Hz signal is used as the "clear" tone, which indicates the presence of a scrambled signal, and is used to carry the Barker word sync signal.

When the voice privacy unit is operating in the secure mode, and the operator pushes the push-to-talk switch 36 on the microphone, relay 37 is actuated, which triggers the monostable multi-vibrator (one shot) 38. The speech signal from the operator is then delayed for a time of from 50 milliseconds to 1.0 second, allowing time for certain link-up operations to be performed. As an example, a repeater may be necessary to establish radio communications between units or between a unit and a home base. The delay allows time for the repeater to begin operation, before actual speech is begun. After the delay, the speech signal is first applied to bi-stable multivibrator (flip-flop) 40 which is triggered to the transmitting state. This signal from the transmitting line of the flip-flop 40 enables a series of counters 43, 44 and 45 (FIG. 2B) which produce the timing signals for the synchronization circuitry. A 976Hz signal from the counters 11—11 is applied to counter 45 (line 46) in conjunction with the enabling signal from flip-flop 40 (line 47). This counter in conjunction with the decoder 48 divides the 976Hz signal by 13, resulting in a 74Hz signal having a period of about 13 milliseconds appearing on line 49. This signal is then applied to counter 43 as shown, which divides the applied signal by 16, producing a signal having a period of 208 milliseconds. This signal is further applied on line 52 to counter 44 which has a single pulse output for every four pulses of input. Between each output pulse of counter 44 is thus a period of 832 milliseconds, which is a basic reference time for the operation of the synchronization circuitry.

At the end of 832 milliseconds, the output signal from counter 44 enables the Barker word generator, which consists of the counter 45 and the decoder 48. A Barker word is a statistically improbable 13-bit digital word (1010110011111) having a probability of approximately 1 in $2^{13}$ chances. The use of the Barker word is well known in the art and the present invention uses a common technique of a four bit counter and a one-of-10 decoder to generate the Barker words. The output of the generator is normally held at ground potential by transistor 70, thus inhibiting the generation of the Barker word. The ground is removed only when the output of gate 71 is low. This occurs when the output of the last stage counter 44, line 72 is high, and the output of the second stage of counter 43, line 73, is low. This period begins at 832 ms after initiation of the counter 45, and ends 26 ms later, when the output on line 73 goes high again. This signal on line 73, after the output on line 72, will also inhibit further operation of counter 43, through gates 75 and 76. The timing counters are thus inhibited at this point, and until the push-to-talk switch is released.

Counter 45 is a 4-bit synchronous counter, the output of which is decoded by the one-of-10 decoder 48. The output of the decoder on line 77 is the Barker word. The output of the gate 78 will be high when the counter output is 11–15 as there is no output of the decoder for these counter values. The gate 78 output will also be high for the other counts, except for those counts associated with those decoder outputs which are connected to the gate 78, when the output of the gate will be low. Specific decoder outputs are connected to the gate to give the above-mentioned Barker word pattern. After a count of seven is reached, the counter 45 is reloaded. Thus the counter will count 11, 12, 13, 14, 15, 0, 1, 2, 3, 4, 5, 6, 7 in a normal pattern. The Barker word is thus 13 bits in length, and two Barker words are produced before the circuit is inhibited. The Barker words diphase modulate the clear 976Hz clock tone. This resulting signal is then filtered, 50, and applied to the audio processing circuity, shown in FIGS. 3A and 3B, for ultimate transmission.

This signal (the clear 976Hz, modulated by two consecutive Barker words) is the reference timing signal for the subsequent operations of the transmission unit. Simultaneously with the inhibiting of the counters at 858 milliseconds, a signal is applied to the delay equalizer circuit 51 (one shot) which initiates the operation of the transmitter's pseudo-random code generator. Thus, when the Barker word is completed, and the counters 43, 44 and 45 are inhibited, a signal is initiated which triggers the operation of the code generator, initiating actual scrambled speech at a time period of 858 msec following the end of the no transmit period. Additionally, with the initiation of the pseudo-random code generator 19, the local oscillator 13 is removed from the circuit. Furthermore, with the conclusion of the Barker word modulation, the masking tone circuits, 53, are enabled, which provide two additional tones of 976Hz and 1,953Hz to be mixed with the speech, modulated, and then transmitted.

Figure 4:
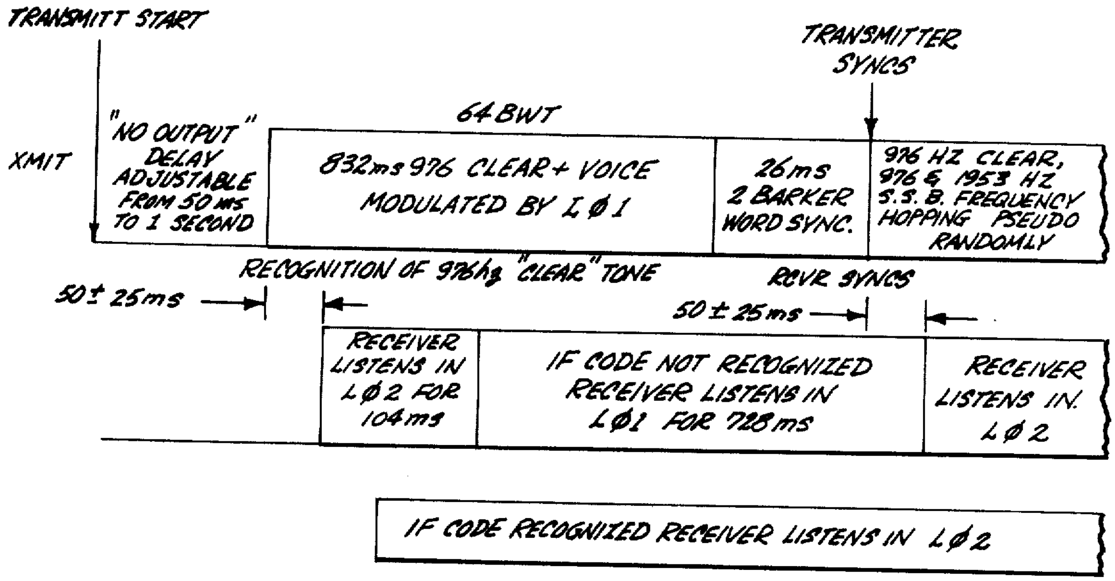
FIG. 4 is a diagram of the time sequencing of the operation of the invention.

The overall timing of a secure transmission is shown in FIG. 4. For the first 50 ms – 1.0 second, after the operator pushes the push-to-talk switch on his radio, there is no output from the transmitter. As explained above, this delay period is adjustable and variable, the amount of delay depending on the individual unit, and the transmission conditions. During the next 832 ms, the operator's speech is inverted by the frequency of the local oscillator (3.125 KHz) and the resulting signal is mixed with a clear 976Hz tone, which indicates a secure transmission. This total signal is then transmitted.

During the following 26 ms period, the "clear" 976Hz tone, now modulated by two successive Barker words, is transmitted alone. This is the synchronization signal for the receiver. At the conclusion of the Barker word modulation, the counters in the timing circuitry are inhibited, the pseudo-random code generator is enabled, and the masking tone circuits are enabled. The operator's speech is first mixed with the masking tones (976Hz + 1953Hz) and the resulting signal is modulated by the output of the pseudo-random code generator. This resulting cipher-text is mixed with the 976Hz tone (now clear again) indicating a secure transmission and then transmitted. This continues until transmission is completed.

Figure 3A:
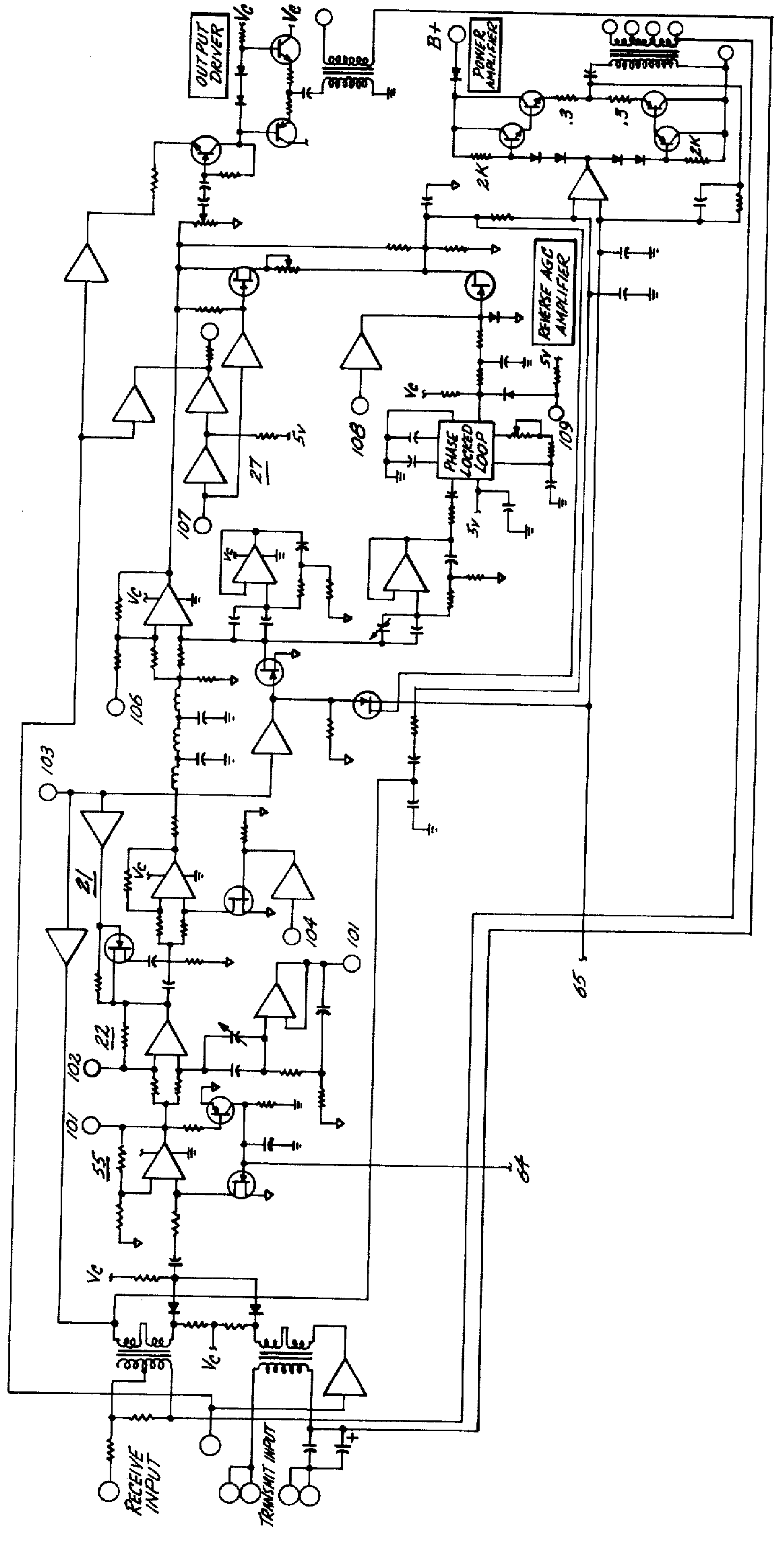

At the receiving end, the input is first applied to an automatic gain control amplifier 55 in the audio processing circuitry (FIG. 3A). This amplifier produces a 1.5 volt peak-to-peak signal output, regardless of the signal strength of the input. This 1.5 volt peak-to-peak signal is then applied to the synchronization circuitry through connection 101. The clock detector 23 in FIG. 2A, which is a narrow bandpass filter, initially extracts any 976Hz "clear" tone from the rest of the transmission. This signal (if present) is amplified and then applied to the phase-locked loop 24 which detects the presence of the clear 976Hz signal. The presence of such a signal indicates that the transmission is in the secure mode and that synchronization of code generators is necessary for recovery of the information contained in the transmission.

The 976Hz clear tone (if present) is then converted to a square wave (circuit 56) which is exactly in phase with the 976Hz clear tone of the transmitter, and applied to the data detection circuit 28, which will detect the presence of modulation (Barker words). The data detector 28 is a full-wave synchronous detector, composed of two synchronous detectors driven by opposite clock phases driving a comparator in a push-pull arrangement.

The input signal to the detector 28 is first filtered, and the resulting signal is then integrated against time by a comparator, driven by two opposing square wave signals. One square wave is taken directly from the AGC amplifier via connection 101, and is exactly in phase with the 976Hz square wave input to the detector. The other square wave is 180° opposed to the first square wave. The resulting integrated signals are applied to a summing amplifier 80, one input of which is inverting. The output of the summing amplifier is the original Barker word modulation.

This data is then shifted into the correlator circuit 29. The correlator circuit contains a 13-bit shift register into which is shifted the 13-bit Barker word. When the data is shifted into the correlator, it is compared with a model Barker word bit by bit. Each comparison in the correlator shift register yields a value of ±1. A positive 1 results if the bit is proper, as defined by the model Barker word and a minus 1 results if the bit is improper. The comparison answers are summed and the total compared to a threshold "value," corresponding to three or less bit errors per word. If the threshold value is exceeded, a positive correlation pulse is produced. This pulse then resets a counter in the correlator circuitry which then begins counting. The following 13-bit data word is then shifted into the shift register and tested. This test will either produce a second correlation pulse or not. If a correlation pulse does result, indicating that the threshold value has been exceeded, within a specified time, as determined by the counter, a synchronization pulse is generated and applied on line 58.

This pulse is applied to the pseudo-random code generator 19 of the receiver. The receiver code generator thus begins to output a pseudo-random frequency signal stream, identical in time and sequence to the frequency stream of the transmitter code generator. This frequency signal stream is used to decipher the received transmission. In relation to the data transmitted, the "received sync" pulse will occur in time at exactly the point that the transmitter's sync pulse (generated at the completion of the Barker word generation) initiated the operation of the transmitter's pseudo-random code generator. Both the transmitter and the receiver are thus synchronized insofar as the initiation of their individual code generators are concerned with respect to the modulation and demodulation of the speech. If both units have the same code setting, resulting in identical pseudo-random frequency streams, secure communication is established and can be maintained by the two units.

Although a preferred embodiment of the invention has been disclosed herein for purposes of illustration, it will be understood that various changes, modifications and substitutions may be incorporated in such an embodiment without departing from the spirit and scope of the invention as defined by the claims which follow

What is claimed is:

1. In combination, an apparatus for synchronizing the initiation of enciphering/deciphering of communication signals between two or more communication stations, comprising:

a transmitter portion, which includes:

means for generating a first signal of known frequency;

means for generating a Barker word digital signal;

means for modulating said first signal with said Barker word digital signal, thereby producing a first modulated signal;

means operative at the conclusion of said Barker word digital signal for initiating the enciphering of communication signals generated at one communication station to produce enciphered communication signals;

means for combining said first signal with said enciphered communication signals for as long as the communication signals are enciphered, thereby providing a continuous indication of enciphered communication, said first signal combined with said enciphered communication signals defining a first combined signal;

means for transmitting said first modulated signal and said first combined signal in sequence, such that said first modulated signal is transmitted to another communication station substantially immediately prior to transmission of said combined signal to said another communication station;

a receiver portion, which includes:

means for receiving said first modulated signal and said combined signal from said one communication station;

means for detecting the first signal, said first signal providing a continuous indication of enciphered communication between communication stations;

means for recovering said Barker word digital signal from said first modulated signal;

means for correlating bit-by-bit said recovered Barker word digital signal with a replica of said Barker word digital signal;

means responsive to said correlator means for generating a summation signal which is proportional in magnitude to the number of correct correlations between said detected Barker word digital signal and said replica;

means for generating a reference signal having a first predetermined magnitude;

means for comparing said reference signal with said summation signal; and, means for initiating deciphering of the enciphered communication signals at the conclusion of correlation if the magnitude of said summation signal is greater than said first predetermined magnitude.

2. An apparatus of claim 1, wherein a code is used to encipher/decipher said communication signals and wherein said Barker word digital signal is independent of said code.

3. An apparatus of claim 1, wherein said Barker word comprises the following sequence of bits: 1010110011111.

4. An apparatus of claim 3, wherein said Barker word digital signal comprises at least two successive identical Barker words.

5. An apparatus of claim 1, including means in the transmitter portion for combining the first modulated signal with a communication signal generated by said one communication station, thereby defining a second combined signal.

6. An apparatus of claim 1, including timing means responsive to the initiation of the transmitter portion by an operator, and means responsive to said timing means to energize said Barker word digital signal generating means at a predetermined time.

7. An apparatus of claim 1, including code generator means having a fixed cycle of operation and a reference setting, wherein said initiating means initiates the operation of said code generating means from said reference setting.

8. An apparatus of claim 1, wherein said correlator means generates a correlator signal of second predetermined magnitude and having a first polarity when a correct correlation exists between said detected Barker word digital signal and said replica, and a correlator signal of said second predetermined magnitude and having a polarity opposite to said first polarity when said correlation is incorrect.

9. An apparatus of claim 8, wherein said means for generating a summation signal includes means to sum said first polarity signals and said opposite polarity signals generated by said correlator means, thereby providing said summation signal.

10. An apparatus of claim 9, wherein said initiating means in the receiver portion includes means for detecting the magnitude of said summation signal.

11. An apparatus of claim 10, wherein said first predetermined magnitude represents six correct correlations for a 13-bit digital signal.

* * * * *